United States Patent [19]

Ebbinghaus

[11] 4,120,176
[45] Oct. 17, 1978

[54] UNIVERSAL JOINT

[76] Inventor: Alfred Ebbinghaus, P.O. Box 1320, 7080 Aalen, Fed. Rep. of Germany

[21] Appl. No.: 696,515

[22] Filed: Jun. 16, 1976

[30] Foreign Application Priority Data

Jun. 19, 1975 [DE] Fed. Rep. of Germany ....... 2527376
Jan. 21, 1976 [DE] Fed. Rep. of Germany ....... 2602074
Feb. 3, 1976 [DE] Fed. Rep. of Germany ....... 2603991

[51] Int. Cl.² .............................................. F16D 3/30
[52] U.S. Cl. ............................................. 64/21; 64/7
[58] Field of Search ........................... 64/21, 8, 7, 6

[56] References Cited

U.S. PATENT DOCUMENTS

| 1,524,161 | 1/1925 | Weiss | 64/7 |
| 2,046,584 | 7/1936 | Rzeppa | 64/7 |
| 2,646,669 | 7/1953 | Barbier | 64/7 |
| 2,809,504 | 10/1957 | Erish | 64/7 |
| 3,107,505 | 10/1923 | Koss | 64/7 |

Primary Examiner—Benjamin W. Wyche
Assistant Examiner—RC Turner

[57] ABSTRACT

A universal joint is defined by housing portions integral with tubular drive and driven shafts. The housing member on the drive shaft is of generally concave internal shape and has surface irregularities which, in combination with generally complementary irregularities on an enlarged end portion of spherical shape on the driven shaft, define the bearing races of the joint.

7 Claims, 3 Drawing Figures

UNIVERSAL JOINT

BACKGROUND OF THE INVENTION

(1) Field of the Invention

The present invention relates to the transmission of rotational moments between a drive shaft and a driven shaft. More specifically, this invention is directed to universal joints and particularly to improved constant velocity universal joints with ball bearing races. Accordingly, the general objects of the present invention are to provide novel and improved methods and apparatus of such character.

(2) Description of the Prior Art

Universal joints for use in delivering torque from a drive shaft to a tubular axle are well known in the art. In the prior art universal joints, ball bearing races are inserted in the joint assembly in the interest of insuring uniform and constant velocity in the transmission of moments; the coupling of torque between the drive and driven shafts being through bearing races which are symmetrical with the joint. Thus, the prior art universal joints are comprised of a plurality of components. In manufacture, the bearing race defining members are separately formed and thereafter installed in the "housing" defining joint portions; the housing defining portions or members typically being integral with the drive and driven shafts. The drive and/or driven shafts may be of tubular constructions in the interest of reducing the weight of the assembly.

The above briefly described prior art universal joints have a number of inherent disadvantages. Perhaps the most significant of these disadvantages resides in the fact that the previous universal joints are comparatively expensive as a result of the fact that a plurality of components must be separately manufactured and thereafter assembled to define the joint. Additionally, the structure of the prior art universal joints requires that a manufacturer or service facility stock spare parts for each of the plurality of joint defining components. As a further disadvantage, the use of a plurality of assembled components to define a universal joint increases the weight of the joint and thus has a deleterious effect at high rmp's; especially in motor vehicle drive train utilization. Thus, drive trains employing conventional prior art universal joints, due to the comparatively large mass of such joints, exhibit wear as a result of the high centrifugal and inertial forces encountered during operation; this being particularly true during deceleration. It is also to be observed that conventional prior art universal joints are known to exhibit comparatively high wear due to their own natural frequency of vibration.

Some prior art drive trains employ universal joints wherein the maximum outer diameter of the joint is approximately equal to the outer diameter of the drive shaft. While such a configuration may have the atttribute of facilitating assembly, this arrangement requires space which may not be available; especially in motor vehicles. In addition, the larger diameter drive shafts required in such assemblies develop greater centrifugal and inertial forces which are known to result in increased wear during decelerations.

SUMMARY OF THE INVENTION

The present invention overcomes the above briefly discussed and other deficiencies and disadvantages of the prior art by providing a novel and improved universal joint characterized by an outer diameter which is at least fifty percent greater than the diameter of the associated drive shaft. This relative reduction in drive shaft diameter frees space which may be employed for the installation of other drive train parts, springs, etc. The reduced diameter drive shaft also exhibits reduced inertial and centrifugal forces and considerably smaller magnitude natural vibrations.

A universal joint in accordance with the present invention is formed from tubular members. More particularly, the facing ends of tubular drive and driven shafts define spherical bearing races in accordance with the invention. Thus, with the exception of the bearings, the present universal joint consists essentially of two members having a wall thickness and formed from a material which will be selected to conform to the dynamic and mechanical conditions to which the joint will be exposed.

BRIEF DESCRIPTION OF THE DRAWINGS

The present invention may be better understood and its numerous objects and advantages will become apparent to those skilled in the art by reference to the accompanying drawing wherein like reference numerals refer to like elements in the several figures and in which.

DESCRIPTION OF THE PREFERRED EMBODIMENT

Figure 1:
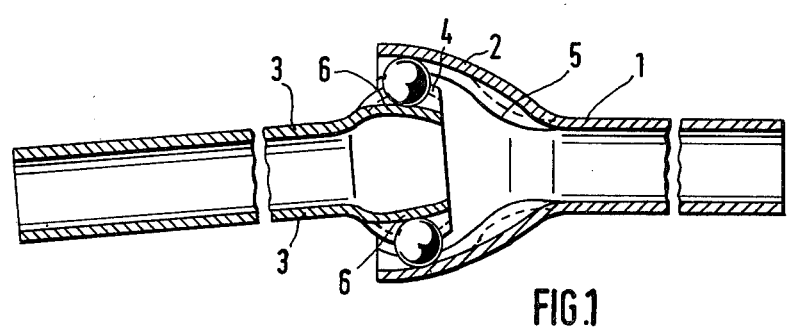
FIG. 1 is a longitudinal section of a first embodiment of a universal joint in accordance with the present invention, the embodiment of FIG. 1 employing an even number of bearings.

With reference now to the drawing, and particularly to FIG. 1, in the universal joint and shaft arrangement shown a drive shaft 1 is coupled to a driven shaft 3; the longitudinal axis of shaft 3 being oriented at an angle with respect to the longitudinal axis of drive shaft 1. The drive shaft 1 is of tubular construction and has an enlarged end portion 2 with a generally concave inner wall. The driven shaft 3 is also of tubular construction and has, at the end adjacent to drive shaft 1, an enlarged portion of generally spherical configuration. The end portions of shafts 1 and 3, and particularly the concave inner wall of portion 2 of shaft 1 and the spherical external shape of the end of shaft 3 cooperate to define the housing of the universal joint of the present invention.

Figure 2:
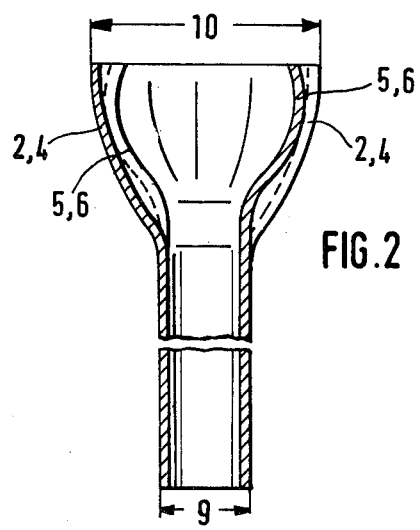
FIG. 2 depicts, in cross-section, the end of the drive shaft which in part defines a universal joint in accordance with a second embodiment of the invention, the embodiment of FIG. 2 employing an odd number of bearings.
Figure 3:
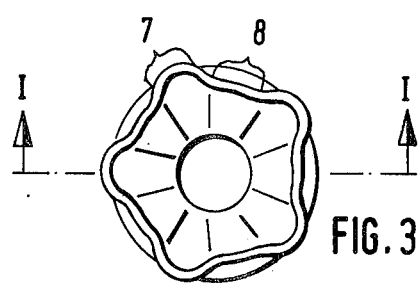
FIG. 3 is an end view of the drive shaft of FIG. 2.

Considering jointly FIGS. 1-3, reference numerals 5 and 6 respectively refer to the ball bearing race defining irregularities formed on the concave end portion 2 of drive shaft 1 and on the spherical end portion of driven shaft 3. As may be seen from FIG. 3, which is an end view of drive shaft 1, the irregularities 5 in the wall of shaft portion 2 define alternating "races" or ball receiving pockets 7 and regions 8 which do not receive balls. The balls received in the races; i.e., the balls carried in "pockets" 7, are trapped between irregularities 5 and 6, respectively, on the inner surface of drive shaft portion 2 and the driven shaft 3, and transmit the torque applied to shaft 1 to shaft 3. The balls, of course, are in contact with the undistorted surface areas of the inner wall of concave portion 2 of shaft 1 and the undistorted wall portion 4 of the spherical end of shaft 3. It will be understood that reference numerals 4 and 6 refer, in FIG. 2, to elements which are not shown in this figure which is an isolated view of the end of the drive shaft 1.

Continuing to refer to FIG. 2, it is to be noted that the maximum diameter 10 of the universal joint, or more precisely the outer diameter of portion 2 of shaft 1, will be at least one and one-half times that of the diameter 9 of the remainder of drive shaft 1. It is also to be noted that the wall thickness of the universal joint defining portions of the drive and driven shafts are essentially equal to the thickness of the remainder of the tubular shafts.

As will be understood by those skilled in the art, the tubular shafts 1 and 3 can be comprised of a material selected for ease of forming and the universal joint can be hardened subsequent to formation. If unusually high mechanical and dynamic requirements are imposed on the joints, the bearing races can be reinforced through the expedient of providing inner and outer stiffening rings.

While a preferred embodiment has been shown and described, various modifications and substitutions may be made thereto without departing from the spirit and scope of the invention. Accordingly, it will be understood that the present invention has been described by way of illustration and not limitation.

What is claimed is:

1. A universal joint comprising:
    an outer bearing race defining member, said outer race defining member having a generally concave internal configuration, said outer race defining member being integral with and at the first end of a tubular drive shaft, the wall thickness of said outer race defining member being the same at all points and being substantially equal to the wall thickness of the tubular drive shaft;
    an inner bearing race defining member, said inner race defining member being integral with and at the first end of a tubular driven shaft and having a generally spherical configuration, said inner race defining member being received in said concave end portion of said drive shaft outer bearing race defining member and cooperating therewith to define ball bearing races; and
    bearings positioned in said races.

2. A universal joint comprising:
    an outer race defining member, said outer race defining member having a generally concave internal configuration, said outer race defining member being integral with and at the first end of a tubular drive shaft and having a maximum outer diameter at least 50% greater than the outer diameter of the drive shaft, said outer race defining member further having a constant wall thickness substantially equal to the wall thickness of the drive shaft and a driven shaft;
    an inner race defining member, said inner race defining member being integral with the tubular driven shaft and cooperating with said outer bearing race defining member to define ball bearing races; and
    bearings positioned in said races.

3. The universal joint of claim 2 wherein said inner race defining member has a generally spherical configuration and is received in the concave portion of said outer race defining member.

4. The apparatus of claim 2 wherein said inner and outer race defining members are provided with irregularities on their facing surfaces, said irregularities being contoured to define a plurality of spatially displaced bearing receiving regions.

5. The apparatus of claim 4 wherein said inner race defining member comprises an enlargement of the end of the driven shaft.

6. The apparatus of claim 5 wherein said surface irregularities extend longitudinally with respect to the axes of the drive and driven shafts.

7. The apparatus of claim 4 wherein said surface irregularities extend longitudinally with respect to the axes of the drive and driven shafts.

* * * * *